Oct. 8, 1957 E. O. KEIZER 2,809,233

COLOR IMAGE REPRODUCTION APPARATUS

Filed June 1, 1955 5 Sheets-Sheet 1

INVENTOR.
EUGENE O. KEIZER
BY
ATTORNEY

Oct. 8, 1957  E. O. KEIZER  2,809,233

COLOR IMAGE REPRODUCTION APPARATUS

Filed June 1, 1955  5 Sheets-Sheet 2

INVENTOR.
EUGENE O. KEIZER
BY
[signature]
ATTORNEY

INVENTOR.
EUGENE O. KEIZER
BY
[signature]
ATTORNEY

Oct. 8, 1957 E. O. KEIZER 2,809,233

COLOR IMAGE REPRODUCTION APPARATUS

Filed June 1, 1955 5 Sheets-Sheet 4

INVENTOR.
EUGENE O. KEIZER
BY
[signature]
ATTORNEY

INVENTOR.
EUGENE O. KEIZER
BY
[signature]
ATTORNEY 2,809,233

COLOR IMAGE REPRODUCTION APPARATUS

Eugene O. Keizer, Princeton, N. J., assignor to Radio Corporation of America, a corporation of Delaware Application June 1, 1955, Serial No. 512,471

8 Claims. (Cl. 178—5.4)

The present invention relates to new and improved color television image reproduction apparatus and, particularly, to apparatus of the type employing a cathode ray tube of the so called horizontal "line screen" variety.

Among the forms of color television image reproducing apparatus proposed thus far is one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically but being in the direction parallel to the groups of strip-like elements. Means are provided additionally to insure tracking of the groups of color elements by the electron beam components in an orderly sequence so that the video signals representative of the respectively different component colors of the image being televised are actually employed in controlling the intensity of the beam component intended to illuminate a given color producing element. Such means, which may be considered as partaking of the nature of a servo mechanism, may employ, for example, special elements (e. g., ultra-violet light emitting material) associated with the target screen for sensing the vertical position of the beam components and for providing indications thereof and means responsive to such indications for correcting the vertical position of the beam components with respect to the screen.

As is well known, television standards provide for the use of interlaced fields (i. e., vertical interlace) for the purpose of increasing vertical resolution of the reproduced image. That is to say, television pictures are transmitted as frames, each frame consisting of two fields, the lines of one field being interdigitated with those of the other field. In the case of horizontal line screen color kinescopes, the matter of vertical interlace has either been treated through the use of relatively complicated circuitry or ignored.

It is, therefore, a primary object of the present invention to provide new and improved color image reproduction apparatus of the horizontal line screen tube variety, which apparatus includes means for effecting vertical interlace of the television fields.

Another object of the invention is that of providing, in apparatus of the types set forth, means for "forcing" the beam components of a kinescope to interlace vertically.

In general, the present invention provides color image reproducing apparatus which includes a kinescope having means for directing a plurality of electron beam components toward a luminescent screen made up of a plurality of groups of strip-like elements such as phosphor strips which are adapted to emit light of respectively different colors upon electron impingement. Associated with the groups of strip-like elements are tracking index signal producing elements (e. g., ultra-violet light emitting material) which are arranged in a regular, repetitive pattern and in a fixed relationship with respect to the strip-like elements of a given color.

In accordance with one specific embodiment of the invention, the strip-like elements of a given color are repeated in the screen with twice the frequency of either of the other colors. An electron beam directed toward the screen is caused to wobble or undulate vertically during its horizontal scanning travel so that it successively traverses strip-like elements of the perspectively different colors. Means responsive to the tracking index signals are included for causing the beam components to scan along predetermined paths and means are additionally included for causing the beam components to skip, during a field interval, only a portion of successive groups of lines, so that, on the next succeeding field scansion, the electron beam is caused to scan along paths including those lines skipped during the preceding field. In this manner, vertical interlacing is effected in a simple but certain fashion. In order to accommodate the color-representative video signals to the different wobble paths traversed during successive television fields, there is provided, according to one form of the invention, means for reversing the phase of the wobble path between successive fields. According to another specific form of the invention, the wobble path phase is the same during both fields but the sequence of application of the color representative video signals to the electron beam is reversed during successive fields.

Additional objects and advantages of the present invention will become apparent to those skilled in the art from a study of the following detailed description of the accompanying drawing, in which.

Figure 1:
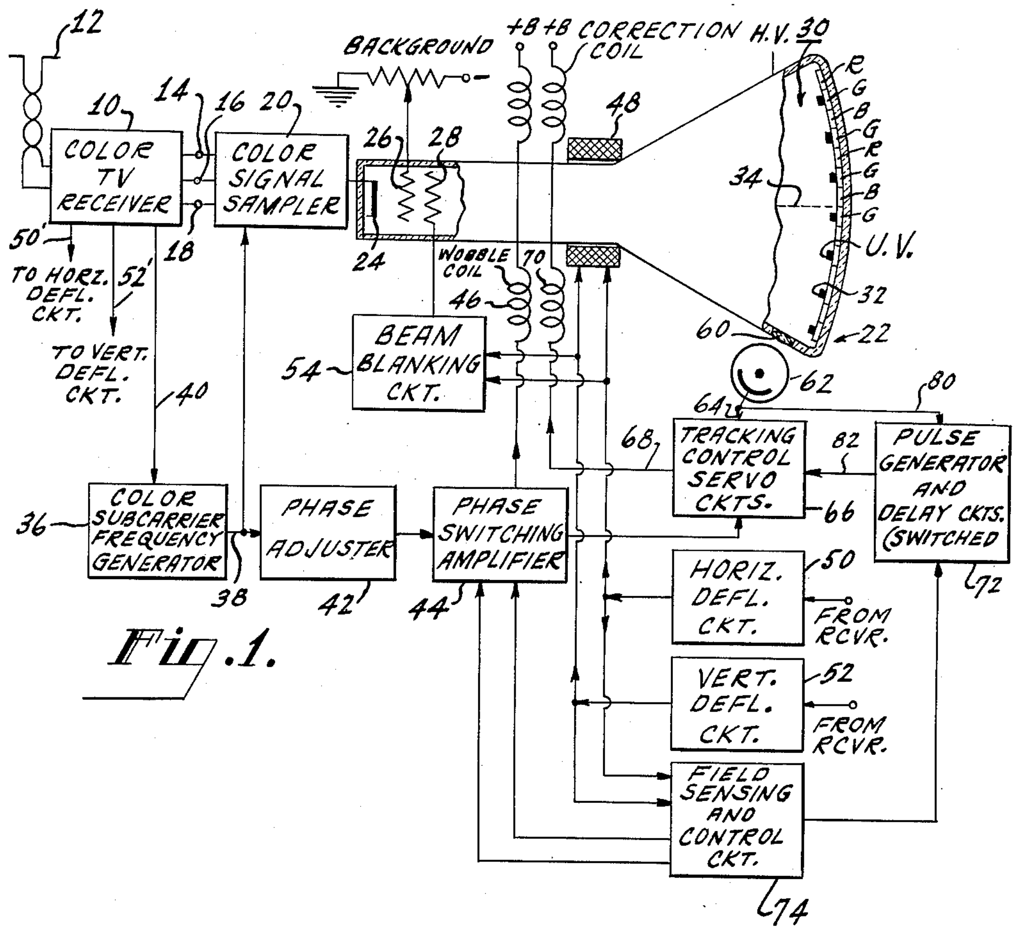
Fig. 1 illustrates, by way of a block diagram, a color television receiver embodying one form of the invention.
Figures 6, 8:
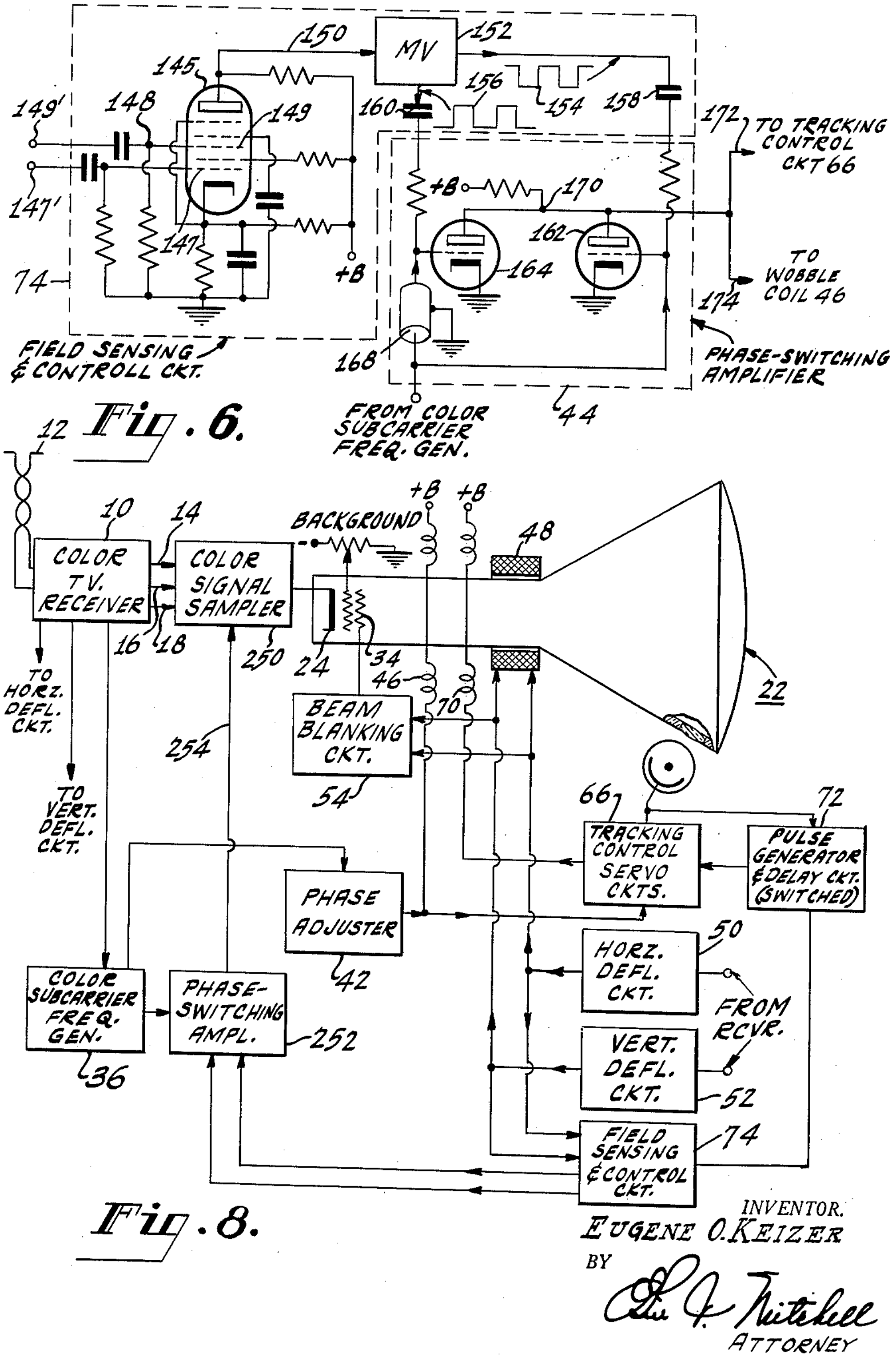
Figure 9:
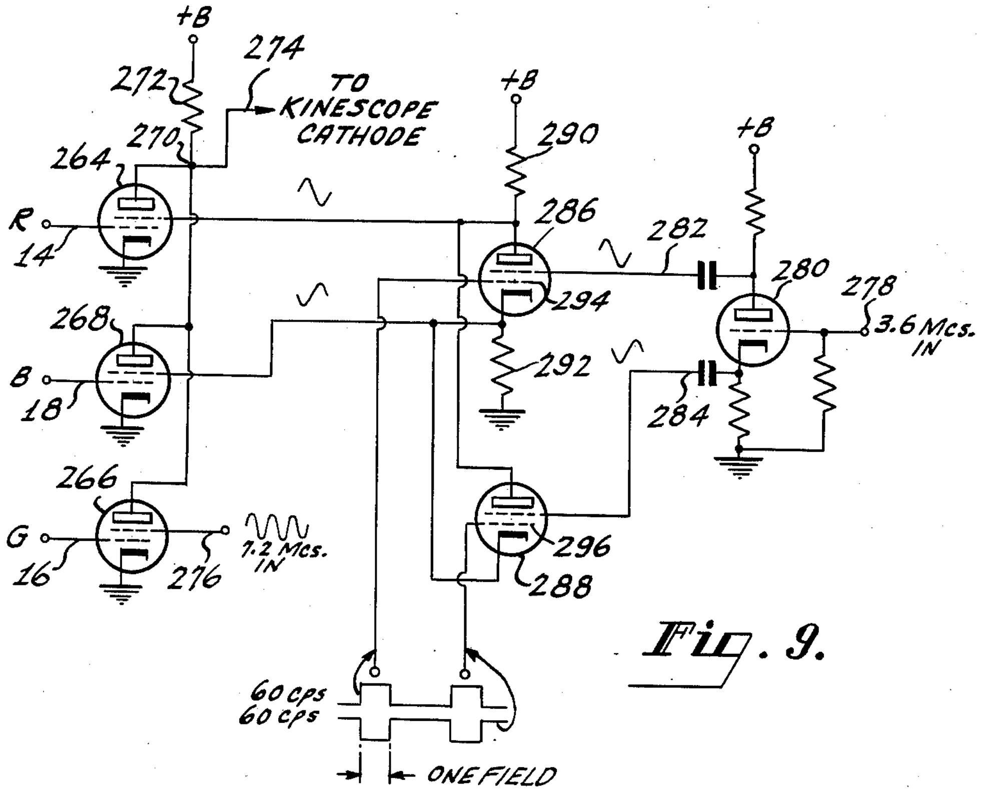

Figs. 4–7, inclusive, are schematic diagrams of circuits useful in performing certain of the functions indicated in Fig. 1;

Fig. 8 illustrates, by way of a block diagram, another form of the present invention; and Fig. 9 is a schematic diagram of circuitry which may be employed in the arrangement of Fig. 8.

Referring to the drawing and, particularly, to Fig. 1 thereof, there is shown a color television receiver 10 adapted to receive composite television signals which are intercepted by an antenna 12. Since the form of signals and the receiver required to operate thereupon do not constitute a part of the present invention, it is sufficient to note that the receiver 10 provides, at its output terminals 14, 16, and 18, video signals representative, respectively, of the brightness of the red, green and blue content of the television subject. Such video signals are produced initially by the scansion of a subject in a line-by-line and field-by-field manner, means being provided for deriving separate video signals respectively indicative of the selected component colors of the subject. By way of example, the receiver 10 may be adapted to process signals of the variety standardized by the Federal Communications Commission on December 17, 1953. Circuitry suitable for deriving simultaneous red, green and blue signals may be found, for example, in the book entitled "Practical Color Television for the Service Industry," revised edition, April 1954 (second edition, first printing, published by the RCA Service Company, Inc., a Radio Corporation of America subsidiary.

The selected component color signals are applied via a color signal sampling circuit 20 to a horizontal line screen color kinescope 22. The kinescope 22, shown diagrammatically in the drawing, comprises an electron gun including a cathode 24 and beam intensity controlling electrodes 26 and 28 for producing and directing an electron beam toward a luminescent target screen 30. With the exception of the screen 30, the kinescope 22 may be of the conventional type employed in black and white image reproduction. As shown in Fig. 1 and, in enlarged fashion, in Fig. 2, the target screen 30 is made up of a plurality of horizontally oriented strip-like phosphor elements arranged in the following sequence; R, G, B, G, R, G, B, etc. It will, therefore, be noted that the green light emitting phosphor strips G occur twice as often as either of the red and blue strips and are alternated with them. Each of the green light emitting phosphor strips G is provided with a centrally disposed index element 32 adapted to emit ultra-violet light in response to electron impingement.

The electron beam 34 is caused to wobble vertically during its horizontal scanning in the following manner: a sine wave generator 36 which may, for example, constitute the local color decoding oscillator of the receiver provides a sinusoidal output wave of 3.6 mcs. at the lead 38. The generator 36 may, therefore, be maintained in synchronism with the color subcarrier wave produced at the transmitter as by means of the color synchronizing bursts forming a part of the composite, received signal, which bursts are indicated as applied to the color subcarrier generator 36 via a lead 40. The 3.6 mcs. wave is applied via a suitable phase adusting circuit 42 and a phase switching amplifier 44 to a wobble coil 46. The wobble coil 46 comprises, by way of illustration, an electro-magnetic deflection winding capable, when energized by the 3.6 mcs. wave from the generator 36, of producing a vertical deflection magnetic field at that freuency, so that the electron beam 34 is caused to wobble or undulate vertically during its horizontal scanning travel. At this point, it may be noted that the electron beam 34 is subjected to a raster scanning deflection field produced by a conventional electro-magnetic deflection yoke 48 which is energized by sawtooth current waves of television line and field frequencies (e. g., approximately 15.75 kcs. and 60 C. P. S.) by horizontal and vertical deflection circuits 50 and 52, respectively, which are synchronized by pulses derived from the composite received signal in the receiver 10. The synchronizing information for the deflection circuits is applied to the latter via leads 50′ and 52′.

Beam blanking pulses of line and field frequencies are derived from the deflection circuits 50 and 52 and applied via a beam blanking circuit 54 to the beam intensity controlling electrode 28 of the kinescope to blank the electron beam 34 during its horizontal and vertical retrace intervals, in a well known manner.

Figure 2:
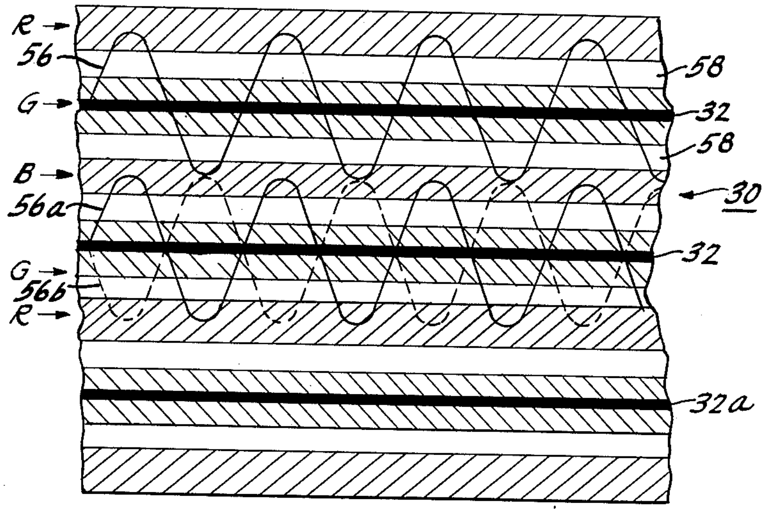
Fig. 2 is an enlarged, fragmentary view of the luminescent screen of the apparatus of Fig. 1, illustrating certain electron beam paths to be described.

From the foregoing, and as will be understood from the showing of Fig. 2, it may be seen that the electron beam 34 is caused to travel along a sinusoidal path such as that shown at 56 in Fig. 2. In its travel, therefore, the electron beam 34 successively impinges upon the green, red, green and blue color light emitting phosphor strips, R, G and B which may, as shown, be separated by guard bands 58 for purposes of increased color purity.

As the electron beam 34 travels along its sinusoidal wobble path 56, it crosses and recrosses the ultra-violet light emitting index strip 32. Each such traversal of the index strip 32 by the beam 34 produces a pulse of ultra-violet light, which light passes through a window 60 in the cone portion of the kinescope to a light-responsive photocell device 62. The photocell 62 converts the ultra-violet light index signals to electrical index signals which are aplied via a lead 64 to the input of a tracking control servo-circuit arrangement 66. When the electron beam path 56 is properly centered with respect to the index strip 32, the ultra-violet light pulses occur at the rate of 7.2 mcs. When, however, the beam erroneously moves upwardly or downwardly, as by reason of scanning non-linearity, the ultra-violet light index signals, instead of being evenly spaced and occurring at the rate of 7.2 mcs. will have a 3.6 mcs. error component. That is to say, if the beam should erroneously be moved downwardly, the 3.6 mcs. component of the index signal will be a sine wave of substantially the "phase" of the wobble path 56. Conversely, if the beam should erroneously be moved upwardly, the 3.6 mcs. error component of the index signal will be a sine wave of the opposite phase from the wobble path sine wave. It will, therefore, be understood that the phase of the electrical index signal produced by the photocell 62, with respect to a reference phase, is indicative of the direction of vertical mispositioning of the electron beam path. The tracking control circuit 66, provided with a reference wave of 3.6 mcs. energy from the generator 36 via the phase adjuster 42 and amplifier 44, serves to compare the phase of the index signal wave with the reference to provide a correction signal at its output lead 68. The lead 68 applies the correction signal to a beam position-correcting coil 70 which may, for example, comprise an electro-magnetic vertical deflection winding capable of controlling the vertical position of the electron beam in the kinescope 22.

In accordance with the present invention, means to be described more fully hereinafter are provided for causing the electron beam wobble path during one field to center along alternate index signal producing strips 32 and, during the next succeeding field, to center along the intervening index strips. For example, as shown in Fig. 2, the first scanning line of a given television field in accordance with the form of invention shown in Fig. 1 would be along the path 56. The next scanning line of that field would be centered along the index element 32*a*. It will be seen, therefore, that the second scanning path of the television field in question skipped the green phosphor strip immediately below the first green phosphor strip scanned by the path 56. During the succeeding television field interval, however, the electron beam paths will center along those green phosphor strips which were skipped during the preceding field. Thus, for example, the first scanning line of the second television field will follow the path 56*a*. The fact that path 56*a* is of different phase from path 56*b* will be explained later. The foregoing described interlaced scanning action is effected through the agency of the apparatus indicated by blocks 72 and 74 which bear the designations "pulse generator and delay circuits (switched)" and "field sensing and control circuit," respectively.

Before describing the action of the circuits 72 and 74, however, note should be made of the fact that, if the beam wobble path is of the same phase during scansions of the second television field as they are during the first field, the beam will be on colored light emitting phosphor strips of different colors at different instants from the strips upon which the beam impinges during the preceding field at those instants. That is to say, it will be seen that, during field No. 1 of the television frame, the electron beam 34 will traverse the differently colored phosphor strips R, G and B in the following sequence: G, R, G, B, G, R, G, B, G. During the succeeding field, however, in which the beam traverses the path 56*a* the sequence in which the beam traverses the phosphor strips will be as follows: G, B, G, R, G, B, G. In accordance with the form of the present invention illustrated in Fig. 1, the phase of the wobble path is reversed during alternate fields, so that the video signal sampling may, without change from field to field, apply color representative video signals to the electron beam at the proper instants.

Such reversal of polarity of the sinusoidal wobble wave is afforded through the action of the phase switching amplifier 44 as controlled by the field sensing and control circuit 74.

Figure 3:
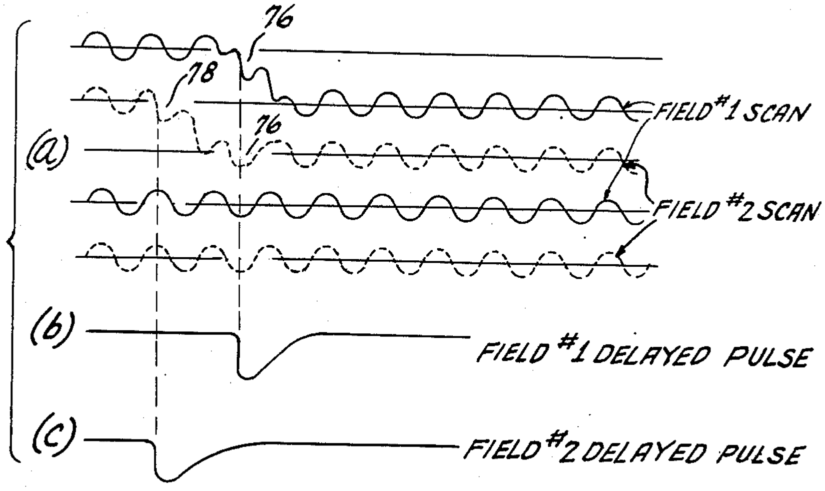
Fig. 3 illustrates, diagrammatically, certain controlled adjustments of the beam paths and wave forms employed in effecting such adjustments.

In addition to the matter of reconciling the phase of the sinusoidal wobble path of the beam with the sequence of sampling of the red, green, and blue representative video signals, means are provided in accordance with the invention for achieving accurate vertical interlace such as has been explained in connection with the showing of Fig. 2. Fig. 3*a* illustrates diagrammatically a series of the ultra-violet light emitting index strips 32. In the interest of simplicity, the color light emitting phosphor strips are omitted from this showing. Alternate ones of the index strips 32 are provided near their left edges (i. e., the edge at which line scanning begins) with small (approximately ¼ to ½ inch) gaps 76. Thus, for example, the first, third, fifth, etc. index elements of the screen have gaps which are vertically aligned, as shown. The intervening index strips 32, however, are provided with similar gaps 78 which are a shorter distance from the left edge of the screen. The gaps 78 in the second, fourth, etc. index strips are vertically aligned with each other.

Assuming that the horizontal deflection overscans the screen 30 and that, as shown, the electron beam 34 is blanked during its retrace intervals, an ultra-violet light signal will be produced as soon as the scan begins at the left edge of the screen by virtue of the impingement of the beam upon one of the strips 32. The block 72 includes means for amplifying and limiting such ultra-violet light signals which are applied thereto via a lead 80 and also includes means for delaying the ultra-violet light pulse signal by two different amounts. The two different amounts of delay imparted to the pulse are so timed, respectively, as to coincide with the scanning of the beam across the gaps 72 and across the gaps 78. More specifically, during the first field of a television frame, for example, the circuit 72 is operative to delay the generated ultra-violet light pulse so that it occurs as the beam scans across the gap 76. This pulse is indicated by wave form (*b*) of Figure 3. During the second television field of the frame, the circuit 72 is operative to delay the ultra-violet light pulse so that it occurs at the time that the beam scans along the gap 78, as shown by the pulse of wave form (*c*) in Figure 3.

The resultant pulses which are of approximately constant amplitude are applied to the tracking control servo circuit 66 via a lead 82. The pulses are, as will be explained, of such amplitude and shape that if, at the instant of their application to the tracking control circuit 66, the electron beam scan is traversing a gap area, the scan will be shifted to the next adjacent index strip 32 (i. e., shifted by the distance between adjacent index strips) and the beam scan will then continue along the new line, centered thereon by the circuit 66. On the other hand, if the pulse does not coincide with a gap, then the action of the tracking control circuit will counteract the pulse so that the scan continues along its original line. The field sensing and control circuit 74 mentioned briefly earlier serves to control the correlation of the pulse delaying action of the circuit 72 between successive fields. As described, therefore, it will be understood that the apparatus of Fig. 1 serves to force the electron beam to interlace vertically during successive field scanning intervals.

Another function of the field sensing and control circuit 74 is that of controlling the phase switching amplifier in such manner as to cause the latter to reverse the phase of the 3.6 mcs. wobble energy applied from the phase adjuster 72 to the wobble coil 46, which phase reversal occurs for alternate television field intervals in accordance with the form of the invention shown in Fig. 1.

While the specific form of tracking control servo circuit shown in Fig. 4 does not per se constitute a part of the present invention, the operation of that circuit will be described in detail in order to afford an understanding of the overall operation of the apparatus of the invention. As has been explained, the wobbling travel of the electron beam 34 results in the production of ultra-violet light pulses which are converted into electrical signals by the action of the photocell device 60. The electrical index signals from the photocell 62 are applied via the lead 64 to an amplifier and limiter arrangement 100. The amplified and limited pulses are, in turn, applied to the control grid 102 of a phase splitter 103. Opposite phases of the pulses produced by the phototube are thus applied via the capacitors 104 and 106 to the control grids 108 and 110, respectively, of comparator tubes 112 and 114 whose cathodes may, as shown, be connected to ground potential and whose anodes 116 and 118, respectively, are connected together at a common load terminal 120 at one end of a load resistor 122. The suppressor grid 124 of the comparator 112 receives a wave of the same phase and frequency as that of the wobble wave applied to a coil 46, while the suppressor grid 126 is applied with a wave of the opposite polarity therefrom (i. e., wobble phase plus 180°). These reference waves are applied to the comparator tubes via a phase splitter 123 which receives a version of the wobble frequency wave from the phase switching amplifier 44. The control grids 108 and 110 of the comparator tubes are connected to suitable bias potential terminals through grid leak resistors and the common load terminal 120 of the comparators is connected via a coupling capacitor coupling 128 to the control electrode of the output amplifier 130 which is of conventional form and which includes the beam position correction winding 70 in the load circuit of its anode 131.

Assuming that winding 70 is so oriented with respect to the kinescope 22 that increased current through the winding moves the electron beam upwardly while decreased current moves the beam downwardly, the operation of the circuit of Fig. 4 will be as follows: the amplifier 100 may include an even number of stages, so that the polarity reversal of the amplifier may be disregarded. Its output signal will, therefore, be understood as being a signal of the same phase as the current produced by the photocell 62 which, as pointed out above, is dependent in phase upon position of the electron beam 34 with respect to the index strips 32. The amplified and limited photocell signal is applied to the comparator 114 and the opposite phase is applied to the comparator 112, the phase reversal being accomplished in the phase splitter 103. Assuming that the beam 34 is erroneously high so that the "negative peaks" of the wobble wave occur near the ultra-violet index strip 32, the output current pulses of the photocell will be of the opposite phase from the wobble described by the beam. The comparator tubes 112 and 114 are so biased that, normally, the current through the winding 70 is sufficient to maintain the beam 34 in what may be termed a centered position. When the input signal to the control grid to the comparator 114 is in phase with the wave applied to the suppressor grid 126, however, that tube will conduct more heavily, as will the tube 112. Such increased conduction of the comparator tubes causes the voltage at the terminal 120 to decrease, thereby lowering the potential of the control grid 130′ of the output amplifier 130, with the result that current through the winding 70 is decreased in an amount sufficient to move the beam 34 downwardly to its correct position.

Conversely, if the beam erroneously moves downwardly in the scanning process, the pulses applied to the control grids 108 and 110 of the comparator tubes will be substantially of the opposte polarity from the 3.6 mcs. waves applied to their suppressor grids. Conduction of both of the comparator tubes will, therefore, decrease, causing the potential of the terminal 120 to increase, thereby applying a more positive potential to the control electrode 130′ of the output amplifier. The current conduction of the amplifier will thus increase to move the beam 34 upwardly to its proper position.

When the electron beam 34 is properly centered with respect to the ultra-violet light emitting index strip 32, the index pulses from the photocell 62 occur at a 7.2 mcs. rate and with no 3.6 mcs. component, so that the comparator tubes produce no change in the conduction of the correction amplifier 130.

Figures 4, 5, 7:
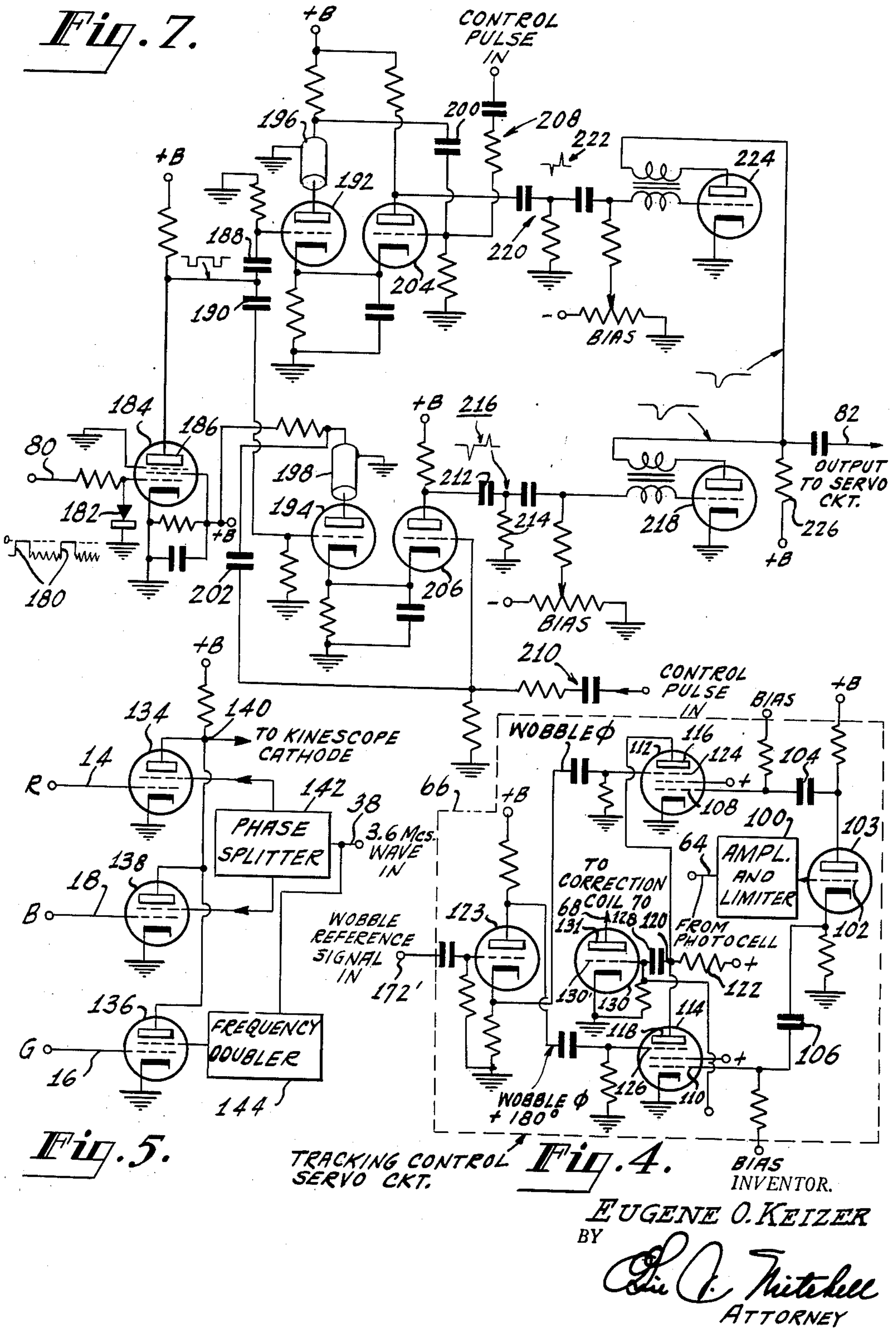

Since, in accordance with certain aspects of the present invention, it is necessary to convert the color representative video signals at the leads 14, 16 and 18 into generally sequential form, there is illustrated in Fig. 5 circuitry suitable for performing that function. The red, blue and green signal leads 14, 18, and 16 are connected, respectively, to the control grids of sampling tubes 134, 136, and 138 which are illustrated, in the interest of simplicity, as tetrodes. The anodes of the sampling tubes are connected to each other at a terminal 40 which is designated for connection to the cathode 24 of the color image reproducing kinescope 22.

A 3.6 mcs. sampling wave from the lead 38 of the color subcarrier frequency generator 36 is applied to a phase splitter 142 which applies opposite phases of the 3.6 mcs. wave to the screen grid electrodes of the sampling tubes 134 and 138. It will, therefore, be understood that the tubes 134 and 138 are alternately rendered conductive (i. e., during a positive drawing half cycles of the waves applied to them via the phase splitter 142). Since, as will be understood from the showing of Fig. 2, the electron beam 34 traverse the green light emitting phosphor strip G at twice the frequency that it crosses the red and blue strip, the green video signal sampling tube 136 is provided at its screen grid electrode with a 7.2 mcs. wave of the proper phase. This latter wave may be derived, as indicated in the drawing, through the agency of a frequency doubler 144 which may comprise, for example, a harmonic generator. That is, the frequency doubler may consist of an amplifier tube adapted to receive a 3.6 mcs. wave on its input electrode and having a resonant circuit in its output which is tuned to the second harmonic of 3.6 mcs. or 7.2 mcs. Thus, the red, blue and green representative video signals applied to the tubes 134, 138, and 136 will appear at the terminal 140 in the sequence green, red, green, blue, green, etc. This sequence it will be noted accords with the phase of the wobble wave 56 in Fig. 2 so that the electron beam 34 is intensely modulated with the proper video signals at the time that it traverses the respective color phosphor strips.

Fig. 6 illustrates, within the dotted line area 74, circuitry suitable for performing the field sensing and control circuit. A multi-grid tube 145 is biased to cut off by virtue of a positive potential applied to its cathode, as shown. The horizontal fly-back pulses from the horizontal deflection circuit are applied to a grid 147 via a conventional R–C coupling network connected to a terminal 147'. Pulses corresponding to the vertical or field rate are applied to a terminal 149' and are differentiated by a network 148 before being applied to a grid 149 in the tube 145. When the two pulses on the grids occur simultaneously, as is the case on alternate television fields, the cut-off bias on the cathode of the tube 145 is overcome and a pulse appears at its anode. This pulse is applied via a lead 150 to a multi-vibrator 152 to trigger the latter at a 30 cycle per second rate (i. e., television frame rate).

The multi-vibrator 152 may be a free running multivibrator having a cycle equal to two television fields (i. e., one which provides positive and negative going pulses, each of which pulses has a time duration equal to one television field interval). Alternatively, the multi-vibrator may be of the monostable variety which is triggered to an unstable state by the coincidence pulse from the tube 145 and which reverts to its stable state at the end of a television field interval. In either event, the multi-vibrator 152 will provide, as will be understood by those skilled in the art, oppositely phased rectangular waves as illustrated by the wave forms 154 and 156. These wave forms are applied via coupling capacitors 158 and 160, respectively, and isolating resistors to the control grids of a pair of amplifier tubes 162 and 164 which comprise the phase switching amplifier 44.

The amplifier tubes 162 and 164 also receive on their respective control grid electrodes opposite phases of the color subcarrier frequency energy provided by the generator 36. By way of example, the 3.6 mcs. from the phase adjuster 42 may be applied directly to the control grid of the tube 162, while a portion of that wave is delayed by 180° as by a delay line 168 and applied to a control grid of a tube 164. By virtue of the application to the control grids of the tubes 162 and 164 of the oppositely phased rectangular waves 154 and 156, those tubes are alternately rendered conductive and non-conductive. That is to say, during a given television field, the tube 162 will be conductive, while the tube 164 is non-conductive and, during the next suceeding television field interval, the states of conduction of the two tubes will be reversed. The anodes of the tubes 162 and 164 comprising the phase switching amplifier are joined at a common load terminal 170 which is designated for connection via the leads 172 and 174, respectively, to the tracking control circuit 66 and to the wobble coil 46 (referring to the showing of Fig. 1).

More specifically, the lead 172 is adapted for connection to the terminal 172' of the circuit of Fig. 4 to provide to the latter the wobble reference wave for use in the comparator tubes described above. By virtue of the field rate switching action of the circuit 44, it will be understood that the wobble phase (i. e., the phase of the wobble path defined by the beam 34) is periodically reversed at a television field rate and that the reference wave applied to the phase comparator circuit of the tracking control arrangement 66 is also reversed at the same rate in order that the operation of the tracking control circuit may properly accord with the changing phase of the wobble wave.

Of the apparatus indicated by way of block diagram in Fig. 1, there remains to be described only the circuitry within the block 72 which comprises the pulse generator and delay circuits. An arrangement in accordance with the present invention for performing these operations is illustrated schematically in Fig. 7. As explained in the above discussion of the overall operation of the arrangement of Fig. 1, the apparatus indicated by the block 72 receives pulses from the photocell 62 corresponding to the pulses of ultra-violet light which are produced by the commencement of each line scansion of the screen 30. That is, since it has been assumed that the beam 34 is blanked during the horizontal retrace intervals and also overscans the screen of the tube, a pulse of ultra-violet light is produced as soon as each line scan begins at the left edge of the screen. The pulses of voltage corresponding to such pulses of ultra-violet light are indicated at 180 in Fig. 7 and are applied to the terminal 80 where they are clamped to a reference voltage level (e. g., ground) through the action of a direct current restoring diode 182 prior to application to the control grid of a limiter amplifier pentode 184. The limited and amplified pulses at the anode 186 of the tube 184 are applied simultaneously via capacitors 188 and 190 to the control grids of delaying amplifier tubes 192 and 194, respectively. That is to say, the amplifier tube 192 has in series with its anode a section of delay line 196 which is adapted to delay the pulses 180 by a predetermined amount such that they occur in time coincidence with the scansion by the electron beam of the gap 78 (see Fig. 3*a*) in the ultra-violet light emitting index strips 32. Similarly, the amplifier 194 has in series with its anode circuit a delay line 198 which delays the pulses 180 by a somewhat greater amount, so that the pulses which it produces occur in time coincidence with the scansion by the beam of the gap 76 in the index strip. In other words, the amplifier 192 and its associated delay line section 196 serve to produce a pulse shown in Fig. 3*c*, designated the field number two delayed pulse, while the amplifier 194 and its delay line 198 serve to produce the pulse shown in Fig. 3*b* which is designated field No. 1 delayed pulse. The output signals of the delay amplifiers 192 and 194 are applied, respectively, via capacitors 200 and 202 to gated amplifier tubes 204 and 206.

The tubes 204 and 206 are arranged to receive via coupling networks 208 and 210, respectively, rectangular waves from the multi-vibrator 152 (Fig. 6) such as those indicated by the waveforms 154 and 156. Thus, during a given television field, the tube 206 will be rendered conductive, while the tube 204 is prevented from conduction by virtue of the positive and negative pulses applied, respectively, to their control grids. During the next television field interval, however, the states of conduction of the tubes 204 and 206 will be reversed, so that the tube 204 conducts and the tube 206 is non-conductive.

The negative going pulses corresponding to the pulses 130 appearing at the anode of the tube 206 during television field No. 1 are differentiated by a circuit comprising a capacitor 212 and resistor 214 to produce alternate negative and positive spikes indicated by the waveform 216 which are applied to the control grid electrode of a blocking oscillator tube 218. The positive going spike of the differentiated waveform triggers the blocking oscillator 218 in a conventional manner so that the oscillator 218 produces a negative-going pulse such as that shown in Fig. 2*b*.

In substantially the same manner, the negative-going pulses at the anode of the tube 204 during television field No. 2 are differentiated by a circuit 220 to produce alternate negative and positive spikes as indicated by the waveform 222 for application to the control grid of a blocking oscillator 224. The oscillator 224 is triggered by the positive spike of the waveform 222 to produce a negative-going pulse shown in Fig. 3*c*. The output signals of the blocking oscillators 218 and 224 appear during alternate television fields across the common load resistor 226 from which they are applied via lead 82 to the tracking control survey circuit. The specific location in the servo-control circuit at which the pulses from the circuit of Fig. 7 are applied may, for example, be as shown in the circuit of Fig. 4. That is to say, the lead 82 of Fig. 7 may be connected to the lead 82' in Fig. 4, so that the negative-going, delayed pulses from the blocking oscillators are applied directly to the control electrode 130' of the correction amplifier 130.

The operation of the tracking control servo-circuit 66 will be influenced by the pulses from the circuit 72 in the following manner: during television field No. 1, the electron beam 34 is intended to scan along those index elements 32 which have the gaps 78. The pulses produced by the circuit 72, however, are timed so that, during television field No. 1, the pulse applied to the control electrode of the amplifier 130 does not occur at the time the beam is traversing the location of the gap 78. Rather, the pulse occurs as shown in Fig. 3*b* so that, if the beam erroneously is scanning along a strip 32 which contains a gap 76, with the servo-circuits 66 maintaining the beam locked to that strip, the negative-going pulse applied to the amplifier will, since no other ultra-violet light signals are applied to the servo-circuit from the photocell, decrease current in the amplifier 130 sufficiently to cause the correction coil field to move the beam downwardly until it scans along the index element 32 just below the one it had been scanning erroneously. The tracking control circuit 66 then locks the beam scanning and maintains the wobble wave centered about the proper index element 32.

During television field No. 2, the pulses such as those shown in Fig. 3*c* are applied to the amplifier 130, which pulses are timed to occur in coincidence with the scanning of the gap 78, since the beam is, during that television field, intended to scan along the index elements which do not contain the gaps 78 but which do contain the gaps 76. Thus, if the beam happens erroneously to be traversing a gap 78 at the time the pulse is applied to the amplifier 130 from the circuit 72, the current through that amplifier and the correction coil 70 will decrease so that the beam is moved down to the next index element where it continues its scansion.

Where, during any given television interval, the electron beam is properly scanning along its intended index element, the application of the negative-going pulses from the circuit 72 to the amplifier 130 does not have sufficient effect upon the action of the tracking control circuit to cause a shifting of the position of the beam since, as will be understood, the tracking control circuit is a feedback or servo arrangement in which the gain of the loop is self stabilized. It is to be noted that the gaps 76 and 78 are located sufficiently close to the left edge of the screen 30 that no appreciable interference with the viewed raster results from the beam shifting action described above. Thus, for example, that portion of the screen in which the gaps are located may be masked and thereby hidden from the view of observers.

While, as described herein, the action of the circuits 72 and 66 is such as to move the beam downwardly to the next index element in order to bring about the scansion of the desired set of elements during a given television field, it will be understood that the plurality of the delayed pulses may be reversed, as through the agency of an amplifier, so that the shifting action of the circuit 66 in response to the pulses is upward, rather than downward.

As has been explained, the form of the present invention illustrated in Fig. 1 and described in connection with Figs. 2–7 includes means for reversing the polarity or phase of the wobble wave during alternate television fields in order to accommodate the color signal sampling sequence through the sequence in which the beam traverses the variously designated color light emitting phosphor strips B, R, and G. Fig. 8, on the other hand, illustrates a second form of the invention, namely, one in accordance with which the sampling sequence is altered during alternate television fields, while the phase of the wobble wave is maintained constant. That is to say, in accordance with the form of invention shown in Fig. 8, the electron beam 34, during television field No. 1, will be caused to scan along the path 56 during a first line interval and along the path 56' during the next line interval of that field. During the next succeeding television field interval, the beam will scan along the path **56*a*, rather than along the reversely phased sinusoidal path shown in dotted lines at 56*b***.

In Fig. 8, those circuit components which correspond to components shown and described in connection with Fig. 1 will be designated by the same reference numerals. Thus, it may be noted that the following circuits of Fig. 8 may be substantially the same as those of Fig. 1; the receiver 10 which receives signals from the antenna 12; the color subcarrier frequency generator 36 and associated phase adjuster 42; the tracking control servo-circuits 66; the pulse generator and delay circuits 72; the field sensing and control circuit 74; the horizontal and vertical deflection circuits 50 and 52, respectively, which furnish deflection energy to the deflection yoke 48 which is associated with the color line screen 22; the beam blanking circuit 54 and the wobble and correction coils 46 and 70, respectively.

According to the operation of the apparatus of Fig. 8, the electron beam 34 in the kinescope 22 is caused to wobble sinusoidally during its horizontal scansions of the screen 30. The wobble path is maintained centered on proper ones of the index strips 32 of the screen through the action, as described in connection with Fig. 1, of the circuits 66, 72, and 74. Since those circuits and their operation have been described in detail, no further discussion thereof is necessary for an understanding of their function in the form of the invention of Fig. 8.

By reason of the fact that the wobble wave **56*a* (Fig. 2) which is the path of the electron beam during each line scanning of field No. 2 is of the same phase as the path 56 which is traversed during field No. 1, it will be seen that the sequence of color sampling performed upon the simultaneous color signals at the leads 14, 16 and 18 must be altered from one field to the next. Specifically, the sequence during field No. 2 (for path 56***a*) is as follows: green, blue, green, red, green, etc. During field No. 1, however, and as has been stated earlier, the sequence is as follows: green, red, green, blue, green, etc. Thus it will be understood that the order in which the red and blue representative video signals are sampled is reversed during alternate television fields. Hence, there is shown in Fig. 8 a color signal sampler 250 located between the reeds 14, 16 and 18 which carry the red, green and blue signals, respectively, and the cathode 24 of the kinescope. The operation of the color signals sampler is controlled by a phase switched amplifier 252 which applies to the sampler a suitably phased wave of 3.6 mcs. energy from the generator 36 via a lead 254.

A suitable circuit for performing the function of the color signal sampler 250 is illustrated schematically in Fig. 9. Red, blue and green video signals are applied from the leads 14, 18, and 16, respectively, to the control grids of the tubes 264, 268, and 266. The anodes of these tubes are connected to each other at a terminal 270 at one end of a common load resistor 272, the terminal 270 being designated for connection via a lead 274 to the cathode 24 of the kinescope. Each of the tubes 264, 266, and 268 further include a screen grid electrode for controlling the conduction of the tube. The green sampling tube 266 receives on its screen grid electrode via a lead 276 a 7.2 mcs. wave which may, for example, be derived in the same manner described in connection with the frequency doubler 144 of Fig. 5. Thus, during each positive half-cycle of the 7.2 mcs. wave, the tube 266 will be rendered conductive to apply green representative video signals to the cathode of the kinescope for modulating the intensity of the electron beam 34. It will be understood, from the foregoing, that the tubes 264 and 268 receive oppositely phased sampling waves of 3.6 mcs. frequency and that, for alternate television fields, the phases of the 3.6 sampling waves applied to the tubes 264 and 268 are reversed. Such reversing action is accomplished in the following manner:

A control wave of 3.6 mcs. is applied to the input terminal 278 of a phase splitter device 280 which provides at its anode and cathode leads 282 and 284 opposite phases of the input wave. The leads 282 and 284 are coupled, respectively, to the control grids of a pair of switched phase splitters 286 and 288, respectively. The tubes 286 and 288 share a common anode load resistor 290 and a common cathode resistor 292 and receive on their respective screen grid electrodes 294 and 296 opposite phases of a rectangular wave which may, for example, be taken from the multivibrator 152 (Fig. 6) which forms a part of the field sensing and control circuit.

Thus, during a given television field, the tube 286 will be conductive, while the tube 288 is non-conductive. In this manner, a certain phase of 3.6 mcs. wave will be applied from the anode of the tube 286 to the screen grid electrode of the red sampling tube 264, while a 3.6 mcs. wave of the opposite phase will be applied from the cathode of the tube 286 to the screen grid of the tube 268. Assuming that the television field interval in question is television field No. 1 (represented by the wobble path 56 in Fig. 2), the sequence of sampling will be as follows: green, red, green, blue, green, etc. During the next succeeding television field, however, the tube 286 is rendered non-conductive while the tube 288 is conductive. By reason of the fact that the tube 288 receives on its control grid a 3.6 mcs. sine wave of the opposite phase from that received by the tube 286, the sine waves apply to the screen grid of the tube 264 and 268 during television field No. 2 will be of the opposite phases from those applied to those tubes during television field No. 1. Hence, the sequence of the color signal sampling will be as follows: green, blue, green, red, green, etc.

From the foregoing, those skilled in the art will recognize the fact that present invention, in accordance with both forms thereof described herein, provides means for effecting vertical interlace in a horizontal line screen color kinescope.

Having thus described my invention, what I claim as new and desire to secure by Letters Patent is:

1. Color television image reproducing apparatus which comprises: a color image reproducing kinescope having a screen made up of a plurality of groups of horizontally oriented strip-like elements of respectively different, preselected component color characteristics and tracking index signal-producing elements associated with said strip-like elements in a repetitive pattern and in a fixed relationship with strip-like elements of a certain color and means for producing and directing an electron beam toward said screen; deflection means for causing said beam to scan a raster on said screen, the lines of said raster being parallel to said strip-like elements; means associated with said kinescope for causing said beam to undulate vertically during its line scanning movement such that said beam describes an undulatory wave which successively traverses different ones of said strip-like elements; means associated with said kinescope and responsive to signals from said tracking index signal producing elements for causing said beam to skip, during a raster, only a portion of successive groups of strip-like elements; and means for causing said beam to scan a succeeding raster along paths including those portions of successive groups of strip-like elements skipped during the preceding raster.

2. Color television image reproducing apparatus which comprises: a color image reproducing kinescope having a screen made up of a plurality of horizontally oriented strip-like elements of respectively different, preselected component color characteristics, there being twice the number of elements of a certain color characteristic as of those of any other color characteristic, the elements of said certain color characteristic being alternated with the elements of the other color characteristics and tracking index signal producing elements associated with such strip-like elements in a regular, repetitive pattern and in a fixed relationship with the strip-like elements of said certain color characteristic and means for producing and directing an electron beam toward said screen; deflection means for causing said beam to scan a raster on said screen, the lines of said raster being substantially parallel to said strip-like elements; means associated with said tube for causing said beam to undulate vertically during its line scanning movement such that said beam describes an undulatory wave which is centered along the strip-like elements of said certain color characteristics and which successively traverses different ones of said strip-like elements; means for modulating the intensity of said beam successively with video signals representative of such different component color characteristics of an image in the order in which said beam traverses said strip-like elements; means for causing said beam to skip, during a raster, alternate ones of said strip-like elements of said certain color; and means for causing said beam to scan a succeeding raster along paths including those strip-like elements skipped during the preceding raster.

3. Color television image reproducing apparatus which comprises: a color image reproducing kinescope having a screen made up of a plurality of horizontally oriented strip-like elements of respectively different, preselected component color characteristics, there being twice the number of elements of a certain color characteristic as of those of any other color characteristic, the elements of said certain color characteristic being alternated with the elements of the other color characteristics and tracking index signal producing elements associated with such strip-like elements in a regular, repetitive pattern and in a fixed relationship with the strip-like elements of said certain color characteristic and means for producing and directing an electron beam toward said screen; deflection means for causing said beam to scan a raster on said screen, the lines of said raster being substantially parallel to said strip-like elements; means associated with said tube for causing said beam to undulate vertically during its line scanning movement such that said beam describes an undulatory wave which is centered along the strip-like elements of said certain color characteristics and which successively traverses different ones of said strip-like elements; means for modulating the intensity of said beam successively with video signals representative of such different component color characteristics of an image in the order in which said beam traverses said strip-like elements; means responsive to signals from said index elements for causing said beam to skip, during a raster, alternate ones of said strip-like elements of said certain color; and means for causing said beam to scan a succeeding raster along paths including those strip-like elements skipped during the preceding raster.

4. Color television image reproducing apparatus which comprises: a color image reproducing kinescope having a screen made up of a plurality of horizontally oriented strip-like elements of respectively different, preselected component color characteristics, there being twice the number of elements of a certain color characteristic as of those of any other color characteristic, the elements of said certain color characteristic being alternated with the elements of the other characteristics and tracking index signal-producing elements associated with said strip-like elements in a regular pattern and in a fixed relationship with the strip-like elements of said certain color characteristic and means for producing and directing an electron beam toward said screen; deflection means for causing said beam to scan a raster on said screen, the lines of such raster being substantially parallel to said strip-like elements; means associated with said tube for causing said beam to undulate vertically during its line scanning movement such that said beam describes an undulatory wave which is centered along the strip-like elements of said certain color characteristic and which succesively traverses different ones of said strip-like elements; means for modulating said beam successively with video signals representative of such different color characteristics; means for causing said beam to skip, during a raster interval, alternate ones of said strip-like elements of said certain color characteristic; means for causing said beam to scan, during the succeeding raster interval, along paths including those strip-like elements of said certain color characteristic skipped during the preceding raster interval; and means for reversing the phase of the undulatory wave described by said beam during said succeeding field interval.

5. Color television image reproducing apparatus which comprises: a color image reproducing kinescope having a screen made up of a plurality of horizontally oriented strip-like elements of respectively different, preselected component color characteristics, there being twice the number of elements of a certain color characteristic as of those of any other color characteristic, the elements of said certain color characteristic being alternated with the elements of the other color characteristic and tracking index signal producing elements associated with said strip-like elements in a regular pattern and in a fixed relationship with the strip-like elements of said certain color characteristic and means for producing and directing an electron beam toward said screen; deflection means for causing said beam to scan a raster on said screen, the lines of such raster being substantially parallel to said strip-like elements; wobble means associated with said tube for causing said beam to undulate vertically during its line scanning movement such that said beam describes an undulatory wave which is centered along the strip-like elements of said certain color characteristic and which successively traverses different ones of said strip-like elements; means for modulating the intensity of said beam successively with video signals representative of such different component color characteristics in the order in which said beam traverses said strip-like color elements during alternate field intervals; means synchronized by said deflection means for identifying intervening field intervals; and means responsive to last-named means for reversing the sequence of such beam modulation with color representative video signals during said intervening field intervals.

6. Color television image reproducing apparatus which comprises: a color image reproducing kinescope having a screen made up of a plurality of groups of horizontally oriented strip-like elements of respectively different preselected component colors and tracking index signal producing strips associated with said strip-like elements in a regular, repetitive pattern and in a fixed relationship with the strip-like elements of a certain color characteristic, the elements of said certain color characteristic being alternated with the elements of the other color characteristics, alternate ones of said index strips having identifying indicia for distinguishing them from intervening index strips and means for producing and directing an electron beam toward said screen; deflection means for causing said beam to scan a raster on said screen, the lines of such raster being substantially parallel to said strip-like color elements; means associated with said tube for causing said beam to undulate vertically during its line scanning movement such that said beam describes an undulatory wave; means responsive to index signals produced by said index strips in response to electron impingement for causing such undulatory wave described by said beam to be centered along an index strip, such that said undulatory wave successively traverses different ones of said strip-like elements in a cycle of undulation; means associated with said kinescope for modulating said electron beam successively with video signals representative of such different component color characteristics in the order in which said beam traverses said strip-like color elements; means operative at a television field rate and associated with said deflection means for causing said beam to scan, during a first television field interval, along successive undulatory paths centered respectively only on alternate ones of said index strips; and means for causing said beam to scan a succeeding raster along undulatory paths centered on the intervening index strips.

7. Color television image reproducing apparatus which comprises: a color image reproducing kinescope having a screen made up of a plurality of groups of horizontally oriented strip-like elements of respectively different preselected component colors and tracking index signal producing strips associated with said strip-like elements in a regular, repetitive pattern and in a fixed relationship with the strip-like elements of a certain color characteristic, the elements of said certain color characteristic being alternated with the elements of the other color characteristics, alternative ones of said index strips having identifying indicia for distinguishing them from intervening index strips and means for producing and directing toward said screen an electron beam; deflection means for causing said beam to scan a raster on said screen, the lines of such raster being substantially parallel to said strip-like color elements; means associated with said tube for causing said beam to undulate vertically during its line scanning movement such that said beam describes an undulatory wave; means responsive to index signals produced by said index strips in response to electron impingement for causing such undulatory wave described by said beam to be centered along an index strip, such that said undulatory wave successively traverses different ones of said strip-like elements in a cycle of undulation; means associated with said kinescope for modulating said electron beam successively with video signal representative of such different component color characteristics in the order in which said beam traverses said strip-like color elements; means operative at a television field rate and associated with said deflection means for causing said beam to scan, during a first television field interval, along successive undulatory paths centered only on alternate ones of said index strips; means for causing said beam to scan a succeeding raster along undulatory paths centered on the intervening index strips; and means associated with said deflection means for reversing the phase of said undulatory wave during alternate field intervals.

8. Color television image reproducing apparatus which comprises: a color image reproducing kinescope having a screen made up of a plurality of groups of horizontally oriented strip-like elements of respectively different preselected component colors and tracking index signal producing strips associated with said strip-like elements in in a regular, repetitive pattern and in a fixed relationship with the strip-like elements of a certain color characteristic, the elements of said certain color characteristic being alternated with the elements of the other color characteristics, alternative ones of said index strips having identifying indicia for distinguishing them from intervening index strips and means for producing and directing toward said screen an electron beam; deflection means for causing said beam to scan a raster on said screen, the lines of such raster being substantially parallel to said strip-like color elements; means associated with said tube for causing said beam to undulate vertically during its line scanning movement such that said beam describes an undulatory wave; means responsive to index signals produced by said index strips in response to electron impingement for causing such undulatory wave described by said beam to be centered along an index strip, such that said undulatory wave successively traverses different ones of said strip-like elements in a cycle of undulation; means associated with said kinescope for modulating said electron beam successively with video signals representative of such different component color characteristics in the order in which said beam traverses said strip-like color elements; means operative at a television field rate and associated with said deflection means for causing said beam to scan, during a first television field interval, along successive undulatory paths centered only on alternate ones of said index strips; means for causing said beam to scan a succeeding raster along undulatory paths centered on the intervening index strips; and means for reversing the sequence of such beam modulation during alternate field intervals.

References Cited in the file of this patent

UNITED STATES PATENTS

| | | |
|---|---|---|
| 2,671,129 | Moore | Mar. 2, 1954 |
| 2,677,723 | McCoy | May 4, 1954 |
| 2,713,606 | Sziklai | July 19, 1955 |
| 2,718,546 | Schlesinger | Sept. 20, 1955 |